No. 722,689. PATENTED MAR. 17, 1903.
R. L. FRINK & W. DE H. LEE.
SHEET GLASS CARRIER FOR LEERS.
APPLICATION FILED JAN. 2, 1902.
NO MODEL.
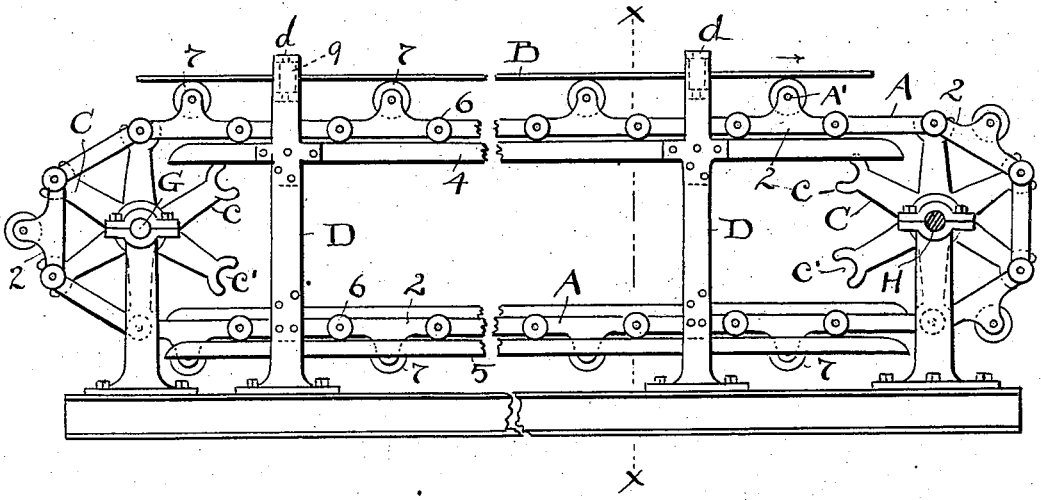
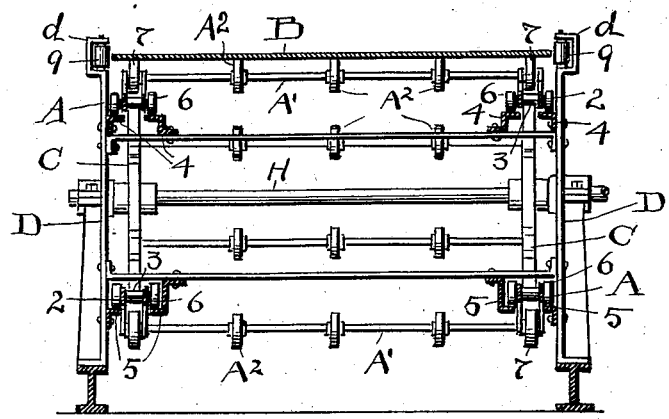
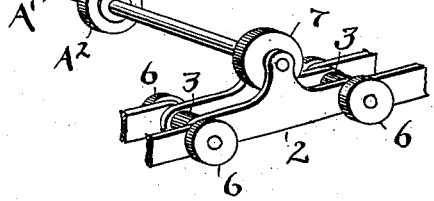
ATTEST.
T. B. Moser
T. M. Madden.
INVENTORS
Robert L. Frink
Walker De Havn Lee
By H. T. Fisher ATTY

UNITED STATES PATENT OFFICE.

ROBERT L. FRINK AND WALKER DE HAVEN LEE, OF CLEVELAND, OHIO, ASSIGNORS, BY DIRECT AND MESNE ASSIGNMENTS, TO THEMSELVES, H. R. SANBORN, J. N. CLARKE, AND J. A. LANNERT, OF CLEVELAND, OHIO.

SHEET-GLASS CARRIER FOR LEERS.

SPECIFICATION forming part of Letters Patent No. 722,689, dated March 17, 1903.

Application filed January 2, 1902. Serial No. 88,067. (No model.)

*To all whom it may concern:*

Be it known that we, ROBERT L. FRINK and WALKER DE HAVEN LEE, citizens of the United States, residing at Cleveland, in the county of Cuyahoga and State of Ohio, have invented certain new and useful Improvements in Sheet-Glass Carriers for Leers; and we do declare that the following is a full, clear, and exact description of the invention, which will enable others skilled in the art to which it appertains to make and use the same.

Our invention relates to endless carriers for leers in the manufacture of sheet-glass; and the invention consists in a carrier constructed and operating substantially as shown and described, and particularly pointed out in the claims.

In the accompanying drawings, Figure 1 is a side elevation of our new and improved leer-carrier, a central portion being broken out to bring the structure within the drawings. Fig. 2 is a cross-section thereof on line X X, Fig. 1. Fig. 3 is a detail view of what is practically one of the links of the endless carrier-chains, showing the rollers thereon.

A represents one of the two similar endless chains constituting the carrier, the two being adapted to bear the sheet of glass B at its edges and by means of cross-rods A' and rollers A² thereon between the sides or edges. It is supposed that when the glass reaches this point from the preceding traveling supports in the system (not shown) it is sufficiently hardened not to bend or sag between the lines of carrier-rollers on the cross-rods, and as many rollers can be placed side by side on said rods as may be deemed necessary.

Carrier-chains should be six or eight inches apart for any width of glass. The one shown is for glass two feet in width.

Each carrier-chain is supported by its own free radially-armed wheels C, alike at both ends and for both the chains, and each chain is constituted with links 2, and intermediate bearings 3 separate said links and serve as points of engagement for the cavities c' in arms c of wheels C. Each carrier-chain or carrier also is shown here as having its own support between wheels C, said support consisting of a frame D, having parallel tracks 4 and 5, respectively above and below, and on the carrier are rollers 6, which run on track or tracks 4 and 5, and rollers 7, which support the glass sheet. Rollers or wheels 6 sustain the carriers their full travel between wheels C at the top and bottom of the leer.

It is not always convenient to time the speed of the carrier with the device which delivers the glass sheet thereto, (not shown,) and hence there is constant liability that the sheet will be scratched or marred in its transfer and travel unless precautions be taken to avoid such injury. For this reason we employ the rollers 7, which accommodate this carrier to a slower or faster speed than the next preceding one, which delivers the glass, and roll with the glass as it comes, however slow or fast this may be. These rollers may in themselves be of a material or construction which will help protect the glass from injury, especially at the time of transfer to the leer, as well as when the glass is borne along to its destination.

The structure here shown is further provided with uprights or posts d, which extend above tracks 4 at intervals and in this instance are extensions of or upon frame D, and in these extensions d, on their inside, are mounted rollers 9, which come opposite the edges of the glass and assist in guiding the glass sheets as they are borne along by chains A. It will be understood that when the glass reaches this carrier it has been divided or broken from its original continuous-sheet form into pieces or sheets of given lengths and that each sheet follows the other in order upon rollers 7 and A².

The wheels C are supported at each end of the leer upon shafts G and H, so that each set of wheels is rigid with its own shaft, and power may be applied from any available source.

The rollers or wheels 6 are on the outside of the endless chains, as here shown, and are supported on the short rod or shaft which unites the links of the chain, and run only over tracks 4 and 5. They might, however, be arranged within the links and have a central track instead of a set of tracks at each side of the chain.

Rollers A² may be either rigid with cross-rod A' or free to rotate thereon. Three or more chains A may be employed in conveying very wide sheets of glass.

What we claim is—

1. In glass manufacture, a carrier for a leer constructed with a series of endless carrier-chains and cross-rods connecting said chains at intervals, and rollers on said chains and cross-rods serving as the immediate supports of the glass, substantially as described.

2. In glass manufacture, a carrier for a leer adapted to convey sheet-glass, comprising a series of endless carrier-chains and a separate supporting-frame for each chain, rollers on said chains traveling on said frames and separate wheels on each chain to support the glass, substantially as described.

3. An endless carrier for glass-leers comprising a series of parallel carrier-chains, upper and lower tracks supporting each chain, rollers on said chains to carry the glass, and carrying-rollers for the chains running on said tracks, and cross connections from chain to chain, substantially as described.

4. A carrier for leers comprising endless carrier-chains and rollers thereon at intervals to support the glass in its travel, and rollers at the sides of the leer serving as guides for the edges of the glass, substantially as described.

5. In glass manufacture, an endless carrier consisting of a series of endless chains provided each with carrying-rollers and a separate series of rollers to carry the glass, and a series of rollers at the sides of the carrier at intervals in position to be engaged by the edges of the glass, substantially as described.

6. A leer-carrier substantially as described comprising endless carrier-chains having each two different sets of rollers, upper and lower tracks for said rollers and wheels at the ends of said tracks supporting said carriers, substantially as described.

Witness our hands to the foregoing specification this 17th day of December, 1901.

ROBERT L. FRINK.
WALKER DE HAVEN LEE.

Witnesses:
R. B. MOSER,
TERESSA M. MADDEN.